(12) United States Patent
Welfonder

(10) Patent No.: US 6,666,252 B2
(45) Date of Patent: Dec. 23, 2003

(54) WINDING MECHANISM

(75) Inventor: Konrad Welfonder, Bremerhaven (DE)

(73) Assignee: Hunter Douglas Industries BV (NL)

( * ) Notice: Subject to any disclaimer, the term of this patent is extended or adjusted under 35 U.S.C. 154(b) by 0 days.

(21) Appl. No.: 10/199,433

(22) Filed: Jul. 19, 2002

(65) Prior Publication Data

US 2002/0179258 A1 Dec. 5, 2002

Related U.S. Application Data

(62) Division of application No. 09/714,399, filed on Nov. 16, 2000, now Pat. No. 6,443,210, which is a division of application No. 09/208,891, filed on Dec. 10, 1998, now Pat. No. 6,155,328.

(30) Foreign Application Priority Data

| Dec. 12, 1997 | (EP) | ............................................. | 97203900 |
| May 28, 1998 | (EP) | ............................................. | 98201772 |
| Sep. 9, 1998 | (EP) | ............................................. | 98203010 |

(51) Int. Cl.[7] ................................................ A47G 5/02

(52) U.S. Cl. ...................... 160/296; 160/313; 188/296; 192/58.3

(58) Field of Search ................................. 160/291, 309, 160/296, 305, 313; 192/216, 58.3; 188/296, 307

(56) References Cited

U.S. PATENT DOCUMENTS

| 2,448,855 | A | * | 9/1948 | Black et al. | |
| 2,618,370 | A | | 11/1952 | Orwin | ........................ 192/58.3 |
| 3,945,473 | A | * | 3/1976 | Prather et al. | |

(List continued on next page.)

FOREIGN PATENT DOCUMENTS

| DE | 3346550 | | 6/1984 | |
| DE | 9203450 | | 8/1992 | |
| EP | 087146 | | 2/1982 | |
| EP | 093289 | | 4/1983 | |
| GB | 319811 | | 9/1929 | ................. 160/296 |
| GB | 2313431 | | 5/1997 | |
| JP | 6-2726 | * | 6/1994 | |
| JP | 6-2727 | * | 6/1994 | |

OTHER PUBLICATIONS

Chironis, N.P. et al., Mechanisms and Mechanical Devices Sourcebook, McGraw–Hill 1996, page 359 (hydraulic governor).

McGraw–Hill Concise Encyclopedia of Science & Technology, 1982, pp. 808–809.

Primary Examiner—Blair M. Johnson
(74) Attorney, Agent, or Firm—Dorsey & Whitney LLP

(57) ABSTRACT

A winding mechanism for controlling the retraction and deployment of an architectural covering, such as a window blind or shade having a winding element 12, about which the covering, or its lift cord or tapes are wound and unwound with rotation of the winding element about a first axis of rotation, and a fluid brake 40 for retarding the rotation of the winding element in at least one direction about the first axis. The fluid brake comprises a fluid tight compartment 42 containing a liquid and an impeller 46. The compartment and the impeller are adapted for relative rotation about a second axis, which can be the same as or coaxial with the first axis. Either the compartment or the impeller is operatively connected to the winding element. In operation the liquid rotates with the rotation of the compartment or the impeller about the second axis. Rotation of the liquid relative to the impeller or to the compartment in at least a first direction about the second axis is effective to retard the rotation of the winding element in at least a second direction about the first axis. The impeller 46, or a peripheral wall surface 43 of the compartment 42 has a first surface 49B that extends generally radially and substantially parallel with respect to the second axis.

6 Claims, 4 Drawing Sheets

U.S. PATENT DOCUMENTS

| | | |
|---|---|---|
| 4,513,805 A | 4/1985 | Mase |
| 4,666,386 A | 5/1987 | Winkler et al. ............. 188/307 |
| 5,355,979 A | 10/1994 | Stephan, deceased et al. .......................... 192/216 |
| 5,421,221 A | 6/1995 | Warchocki |
| 5,449,054 A | 9/1995 | Wiese et al. |
| 5,634,507 A | 6/1997 | Kwota ........................ 160/296 |
| 5,664,286 A | 9/1997 | Sorimachi |
| 5,697,122 A | 12/1997 | Okabe et al. |
| 6,155,328 A | 12/2000 | Welfonder |
| 6,173,822 B1 | 1/2001 | Korb et al. |
| 6,443,210 B1 * | 9/2002 | Welfonder |

* cited by examiner

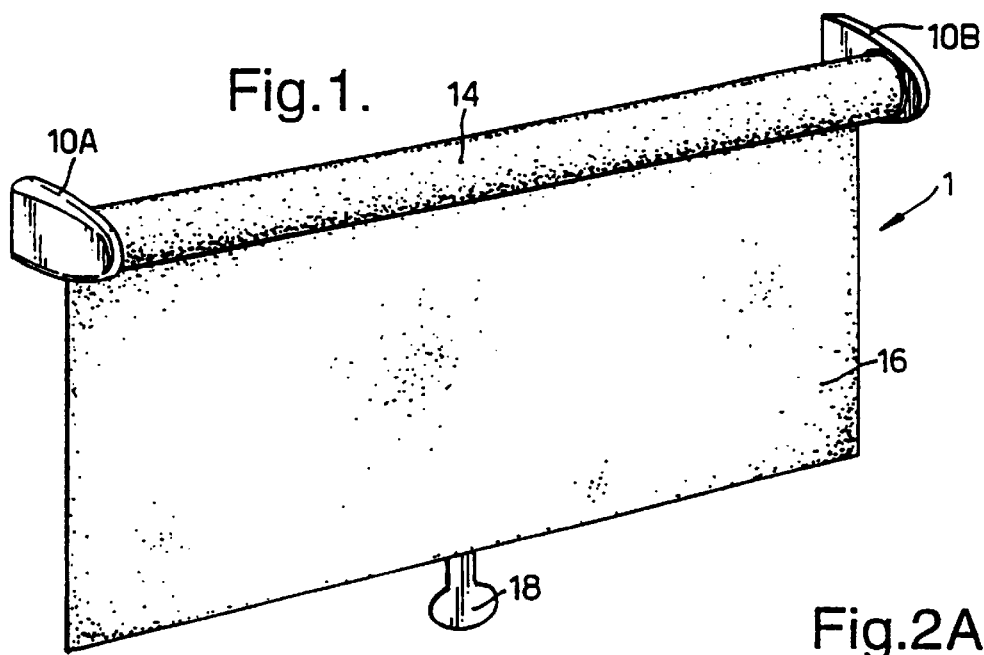
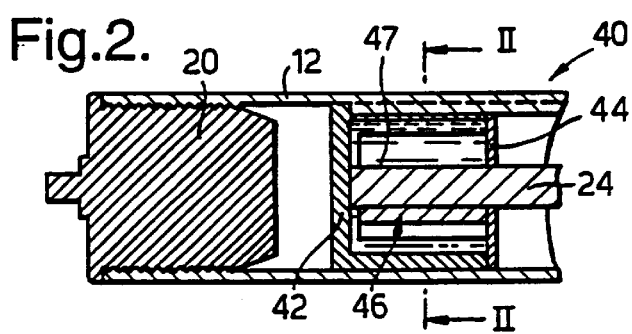
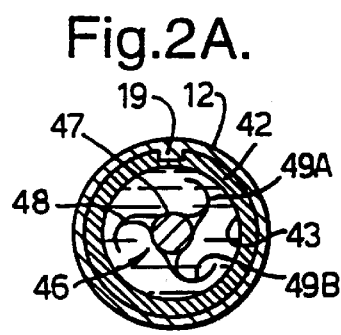
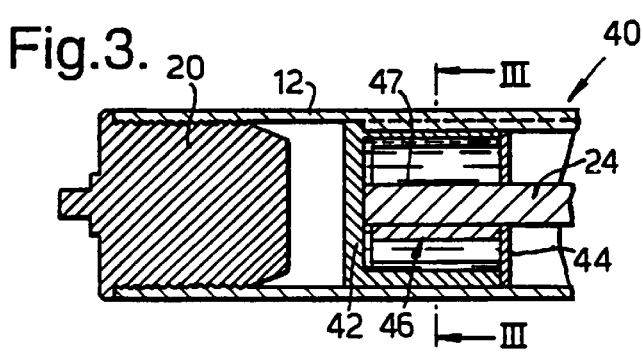
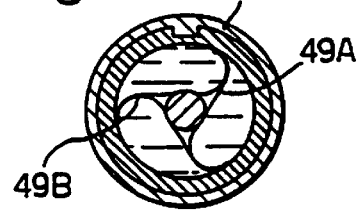
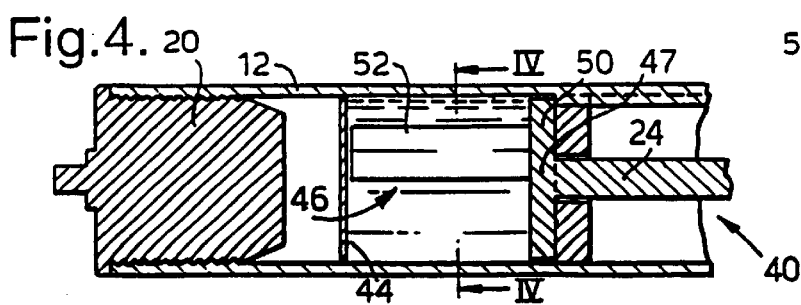
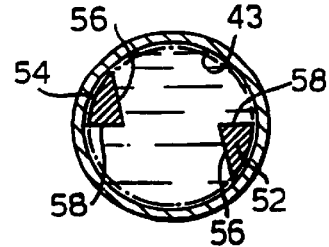

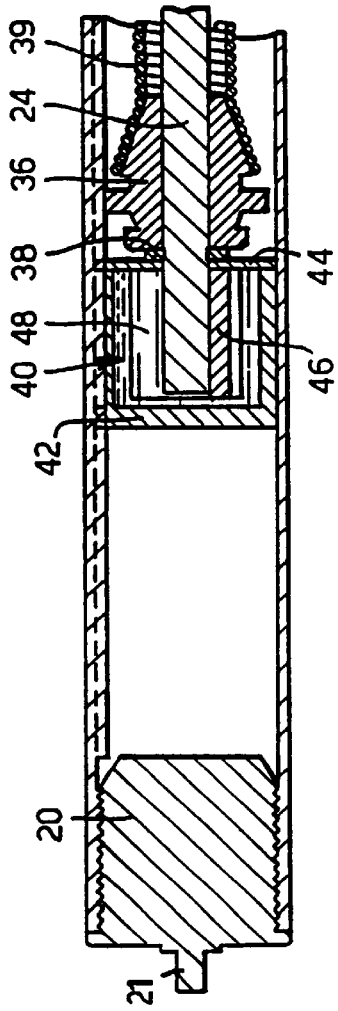
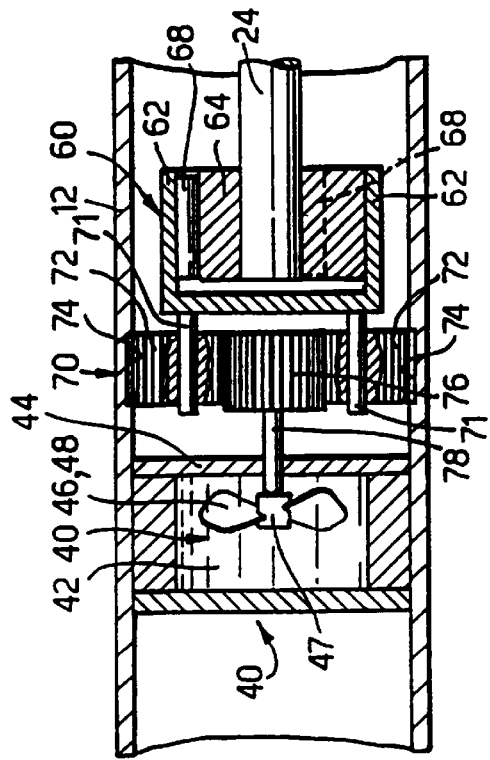
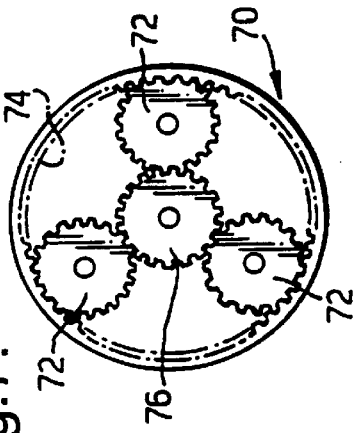
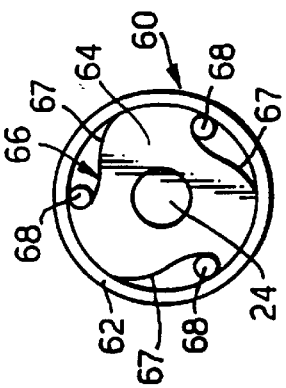

WINDING MECHANISM

CROSS-REFERENCES TO RELATED APPLICATIONS

This application is a division of prior U.S. application Ser. No. 09/714,399, filed Nov. 16, 2000, now U.S. Pat. No. 6,443,210, which is a division of U.S. application Ser. No. 09/208,891, filed Dec. 10, 1998, now U.S. Pat. No. 6,155,328, issued Dec. 05, 2000, which claims priority to European Patent Application No. 98203010.8, filed Sep. 9, 1998; European Patent Application No. 98201772.5, filed May 28, 1998; and European Patent Application No. 97203900.2, filed Dec. 12, 1997. Each of the above-identified applications is hereby incorporated by reference as though fully disclosed herein.

BACKGROUND OF INVENTION

1. Field of Invention

This invention relates to a winding mechanism for controlling the retraction and deployment of an architectural covering, especially a covering for an architectural opening, such as a window blind or shade. This invention particularly relates to a spring-assisted winding mechanism useful for controlling the winding and unwinding of the covering, itself, about a tubular roller or for controlling the winding and unwinding of lift cords and/or tapes of the covering about a spool or the like. This invention quite particularly relates to a fluid brake which can be used in such a winding mechanism to control the retraction or winding up of the covering or the lift cords or tapes.

2. Description of the Known Art

Winding mechanisms for retracting or raising window shades and blinds have often used a spring retraction mechanism to bias the shades and blinds towards their retracted position. To hold a shade or blind in its deployed or lowered position, these mechanisms have also been provided with a locking mechanism. Conventionally, the locking mechanism has involved an arrangement in which, when the shade or blind has been pulled down or unwound and then released, the shade or blind has been locked in the lowered position. If the shade or blind has been pulled down again, the locking mechanism has been released, and a spring retraction mechanism has caused the shade or blind to be retracted or rolled up again. Such roller mechanisms have been used, for example, for winding and unwinding roller blinds and lift cords of pleated blinds and roman shades. See EP 0 087 146.

Recently, there has been an increased demand for a device for retracting or braking the rotational speed of retraction of spring-assisted winding mechanisms of shades and blinds. Such rotational speed of retraction, if not smoothed or controlled, can cause shades and blinds to fly up and can easily damage their components when they are retracted. To avoid such damage, it has been proposed to use mechanical braking or retarding devices to obtain a continuous, smooth and controlled retraction of the blinds.

One such retarding device, described in EP 0 093 289, has used a pair of centrifugally-acting brake shoes inside a brake drum. To achieve the required centrifugal speed, an epicyclic gear train has been provided to speed up rotation of the assembly, upon which the brake shoes are mounted. However, because it is essentially a mechanical retarding device, the retarding device of EP 0 093 289 has been subject to friction and wear and thus has tended to become less effective over time.

An additional demand has been for a retarding device which is effective in only the direction of rotation for retracting the shades and blinds, in order not to interfere with unwinding or lowering them. This has also been achieved to some extent by means of the one-way helically-wound spring clutch used in the retarding device described in EP 0 093 289.

It has also been proposed, in DE-G-92 03 450, to use a fluid brake containing a liquid, the viscosity of which increases when it is subjected to increasing shear stresses, for retarding the rotational speed of retraction of spring-assisted winding mechanisms of shades and blinds.

In this regard, such a liquid (e.g., a silicon oil) has been provided in a fluid-tight cylindrical compartment within a roller, and a fixed centre shaft of the roller has been positioned axially within the compartment. Upon rapid rotation of the roller and compartment about the shaft when retracting a shade, the liquid is subjected to increased shear stress, causing its viscosity to increase and causing it to retard such rotation.

SUMMARY OF THE INVENTION

In accordance with this invention, a winding mechanism for controlling the retraction and deployment of an architectural covering, such as a window blind or shade, is provided having a winding element, about which the covering or its lift cord or tapes are wound and unwound with rotation of the winding element about a first axis of rotation, and a fluid brake for retarding the rotation of the winding element in at least one direction about the first axis; the fluid brake comprising a fluid-tight compartment containing a liquid and an impeller and wherein: the compartment and the impeller are adapted for relative rotation about a second axis of rotation; the compartment or the impeller is operatively connected to the winding element; the liquid rotates with rotation of the compartment or the impeller about the second axis; rotation of the liquid relative to the impeller or to the compartment in at least a first direction about the second axis is effective to retard the rotation of the winding element in at least a second direction about the first axis; and the impeller or an inner peripheral wall surface of the compartment has a first surface that extends generally radially and substantially parallel with respect to the second axis.

Preferably the first and second axes are coaxial, and advantageously the first and second directions are the same.

Advantageously the compartment is operatively connected to, and rotates with, the winding element and rotation of the liquid with the compartment, relative to the impeller, in at least the first direction about the second axis is effective to retard the rotation of the winding element in at least the second direction about the first axis. Advantageously, the fluid brake is within the winding element.

The liquid preferably has a viscosity that increases with increasing agitation of the liquid in the compartment.

In accordance with one embodiment of the invention, the first surface is on a vane eccentrically mounted on, and protruding axially from, a radially-extending disk of the impeller or is on a vane mounted on, and protruding radially from, a hub of the impeller, especially where: i) the inner peripheral wall surface of the compartment is generally cylindrical; ii) the impeller has a plurality of the vanes which are movable and can be flexible and resilient but are advantageously hingedly connected to the impeller; and iii) each vane also has a second surface that can be moved towards the inner peripheral wall surface when pressure is exerted by the liquid against the first surface of the vane. In this regard, it is particularly advantageous that the second surface of each vane can frictionally engage the inner peripheral wall surface of the compartment when pressure is exerted by the liquid against the first surface of the vane, especially where each vane has a curvilinear cross-section that is concave towards the first surface.

In accordance with another embodiment of the invention, the impeller does not rotate or rotates in the opposite direction from the rotation of the compartment about the second axis. In this regard, it is particularly advantageous that a one-way clutch be interposed between the winding element and the compartment or the impeller, especially where an inverting gear assembly, particularly a speed-up gear assembly, is interposed between the clutch and the compartment or the impeller. The speed-up gear assembly may comprise an epicyclic gear train having a sun gear, planet gear wheels and a ring gear; and wherein the impeller is connected to the sun gear, the planet gear wheels are rotatably carried by the one-way clutch, and the ring gear is connected to the winding element for rotation therewith.

It is also contemplated that the winding mechanism should further comprise: an elongate longitudinally-extending hollow roller extending along the first axis, having its opposite ends rotatably connected to a pair of bearing journals and having an end of the covering attached to it; a fixed element within the roller, connected to one of the bearing journals; and a spring-urged winding mechanism operatively connected to the fixed element and the roller and adapted to urge the roller to rotate in a first direction about the first axis to retract the covering; and wherein the fluid brake is within the roller, is operatively connected to the roller and the fixed element, and retards substantially only rotation of the roller in the first direction of rotation. In this regard, it is particularly advantageous that the compartment of the fluid brake be connected to the roller for rotation therewith.

In accordance with other aspects of the invention, an architectural covering, such as a window blind or shade, is provided comprising the winding mechanism just described, and a fluid brake is provided as just described.

DESCRIPTION OF THE DRAWINGS

In order that the present invention may more readily be understood, the following is given, merely by way of example, reference being made to the accompanying drawings in which:

FIG. 1 is a schematic perspective view of a blind with a first embodiment of a winding mechanism of this invention;

FIGS. 2 and 3 are longitudinal cross-sections through a portion of the winding mechanism of FIG. 1, with a first embodiment of its fluid brake shown with the vanes of its impeller in two different working positions-unflexed and flexed, respectively;

FIGS. 2A and 3A are cross-sections along the lines II—II and III—III of FIGS. 2 and 3 respectively;

FIG. 4 is a view similar to FIG. 2 of the winding mechanism of FIG. 1 with a second embodiment of its fluid brake;

FIG. 4A is a cross-section along the line IV—IV of FIG. 4;

FIG. 5 is a longitudinal cross-section of a winding mechanism of this invention (with a portion shown broken away);

FIG. 6 is a fragmentary cross-section of a modified winding mechanism;

FIG. 7 is an end elevation of the epicyclic gear train mechanism shown in FIG. 6;

FIG. 8 is an end elevation of the one-way clutch shown in FIG. 6;

FIG. 1 shows a roller blind 1, the ends of which are attached to a pair of conventional brackets 10A and 10B for mounting the roller blind 1 on a wall, adjacent to a window. The roller blind 1 has an elongate hollow tubular roller 12 which cannot be seen in FIG. 1 because a top portion 14 of a shade 16 is wound about the roller 12. The top end of the shade 16 is attached to the roller 12 in a conventional manner. A conventional pull-tab 18 is provided at the bottom end of the shade 16.

FIG. 5 shows the interior of the longitudinally-extending hollow tubular roller 12 of the roller blind 1 in longitudinal cross-section. Within the left end portion of the roller 12 is a coaxially-extending journal and member 20, which is fixed to the roller 12 and is therefore rotatable therewith. A longitudinally-extending journal spigot 21 on the left end of the end member 20 rotatably therewith. A longitudinally-extending journal spigot 21 on the left end of the end member 20 rotatably engages the adjacent bracket 10A, so that the end member 20 and roller 12 are rotatably journalled relative to the left bracket 10A.

Figure 9:
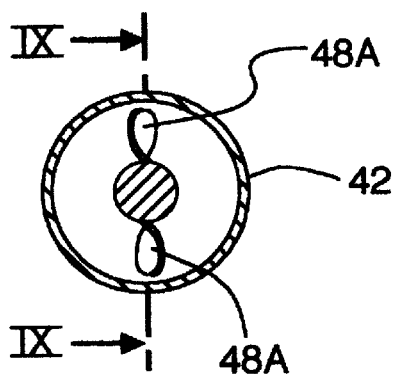
FIG. 9 is a view similar to FIG. 4A of a third embodiment of fluid brake.

Within the right end portion of the roller 12, as shown in FIG. 5, is an end cap 22, non-rotatably mounted on the right end of a longitudinally-extending center rod 24. Roller 12 will rotate relative to the end cap 22. A flattened right end portion 26, preferably of rectangular cross-section, of the center rod 24 engages a corresponding, preferably rectangular, opening in the adjacent right bracket 10B, so that the center rod 24 is non-rotatably connected to the right bracket 10B, with the roller 12 journalled relative to the center rod 24.

FIG. 5 also shows the end cap 22 engaging a longitudinally-extending sleeve 28 which serves as a bearing for the roller 12. The sleeve 28 has an end wail 29 at its left end and accommodates a conventional lock 30, such as is described in EP 0 087 146 and commonly used in spring-loaded blinds, such as roller blinds. The lock 30 serves to releasably restrain the end cap 22, the sleeve 28 and roller 12 from rotating about the fixed centre rod 24. In use, one pulls downwardly on the tab 18 to lower or unwind the shade, and the lock 30 holds the roller 12 and thereby the shade in that position. In order to raise or wind up the shade 16, one pulls down again on the tab 18 to unlock the lock 30, and a spring mechanism, described below, causes the roller 12 to rotate and the shade 16 to be raised. The roller 12 can be arrested in any desired position of either retracting or unwinding the shade 16, using the lock 30.

Within the roller 12 and to the left of the end wall 29 of the sleeve 28 is a coaxially-extending first spring retainer 32. The first spring retainer 32 is rotatably mounted on the centre rod 24, which is fixed to the right bracket 10B, and engages, preferably frictionally, the inside surface of the roller 12 so that the first retainer rotates with the roller about the centre rod. 'In this regard, the first spring retainer 32 is retained axially in place by a first circlip 34, fixed on the centre rod. Further to the left of the end wall 29, a coaxially-extending second spring retainer 36 is non-rotatably secured to the fixed centre rod 24 and retained axially in place by a second circlip 38.

A conventional, longitudinally-extending torsion or coil spring 39 is helically wound about the centre rod 24 between the spring retainers 32, 36. The ends of the spring are held by the spring retainers 32, 36, whereby the spring can thereby function as a spring motor or retraction mechanism between the roller 12 and the centre rod. The spring 39, which is tensioned as a result of lowering the shade 16, relaxes when the shade is fully retracted by being rolled up about the roller 12.

The arrangement of the shade 16 and roller 12, described so far, is generally conventional. However in accordance with this invention, the shade-winding mechanism of the roller blind 1 further includes a fluid brake or speed retarding mechanism 40, which is operative between the roller 12 and the fixed centre rod 24 only when rewinding or retracting the shade 16. In this regard, the roller 12 has, to the left of the second spring retainer 36, a coaxially-extending, preferably generally cylindrical, fluid-tight compartment 42 with a closure lid 44 mounted on its right end as shown in FIG. 5. The left end portion of the centre rod 24 is located axially within the fluid-tight compartment 42 and has as an impeller 46 mounted on it. The impeller 46 is positioned concentrically within the compartment 42 with the hub 47 of the impeller on the longitudinally-extending axis of rotation of the compartment. Mounted on the circumference of the impeller hub 47 within the compartment 42 are a plurality, preferably 2 or 3, vanes 48, extending generally radially from, and substantially parallel to, the axis of rotation of the compartment. As seen from FIGS. 2, 2A, 3 and 3A, the vanes 48 are flexible and preferably inherently resilient. The radial ends of the vanes are close to, but spaced away from, the cylindrical inner peripheral wall surface 43 of the compartment 42, and the longitudinal ends of the vanes are close to, but spaced away from, the longitudinal ends of the compartment 42. In this regard, each vane 48 has a first surface 49A, the radial end of which can be moved towards and away from the inner surface 43 of the compartment 42 when pressure is exerted against a second surface 49B of the vane, on the opposite side of the vane. Preferably, each vane 48 has a curvilinear cross-section that is concave towards its second surface 49B, and is convex towards its first surface 49A.

Figure 10:
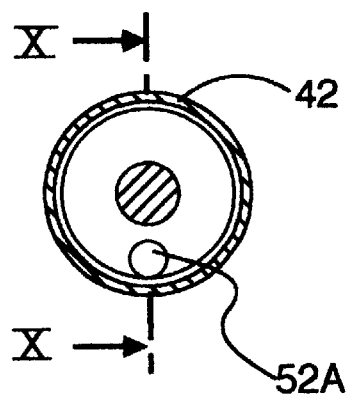
FIG. 10 is a view similar to FIG. 4A of a fourth embodiment of fluid brake.
Figure 11:
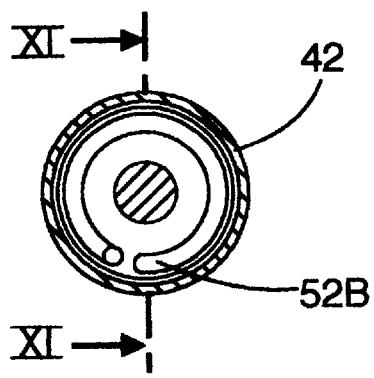
FIG. 11 is a view similar to FIG. 4A of a fifth embodiment of fluid brake.

The fluid-tight compartment 42 of the fluid brake 40 of FIGS. 2 and 3 is filled with a liquid, preferably a viscous liquid, which is somewhat sticky and therefore will readily rotate within the compartment with rotation of the inner surface 43 of the compartment. The viscosity of the liquid can be constant or variable. In certain embodiments of the fluid brake of this invention, the viscosity of its liquid is preferably variable and increases with increasing agitation and turbulence of the liquid caused by its relative movement around the impeller 46 and vanes 48 but decreases to its initial value when it is no longer agitated and turbulent. Examples of such a liquid include conventional silicone oils, such as are available from Drawin Vertriebs GmbH, Postfach 110, D-85509 Ottobrunn. In this regard, the use of a liquid, the chain length of the molecules of which effectively becomes longer with increasing agitation and turbulence, whereby the liquid thickens, is especially preferred in the fluid brakes 40 of FIGS. 9 to 11 (discussed below) but can also be used in the fluid brakes of FIGS. 2, 3 and 4 (discussed below). Examples of such a liquid include conventional aqueous starch solutions. When additionally a planetary gear is coupled to the hub 47 of the impeller 46, as described below with reference to FIG. 6, a liquid that is relatively less viscous can be used in the fluid brake 40.

FIGS. 2A and 3A show that the inner surface of the roller 12 has a longitudinally-extending key 19 which engages a corresponding longitudinally-extending slot in the outer surface of the compartment 42 of the fluid brake 40. As a result, the compartment 42 and roller 12 rotate together, and any braking of the rotation of the compartment 42 will brake rotation of the roller 12.

In use, when the shade 16 is to be raised or retracted, the spring 39 loosens or unwinds, which causes the roller 12 to rotate clockwise in FIGS. 2A and 3A. When the roller 12 rotates clockwise, the compartment 42 of the fluid brake 40 rotates clockwise with it, and the liquid in the compartment 42 rotates clockwise with the inner surface 43 of the compartment. However, the vanes 48 of the impeller 46, mounted on the fixed centre rod 24, do not rotate. As a result, the clockwise rotation of the liquid is hindered by the second surface 49B of each of the vanes 48, and the liquid can only flow between the ends of the vanes and the inner wall surface 43 of the compartment. This causes the differential pressure of the liquid on the concave second surfaces 49B of the vanes 48, relative to their first surfaces 49A, to be positive during clockwise acceleration and rotation of the roller 12 and compartment 42, whereby the vanes flex, from the position shown in FIG. 2A, radially outwardly in a clockwise direction and their first surfaces 49A move towards the cylindrical inner surface 43 of the compartment 42 and finally to the position shown in FIG. 3A. This flexing of the vanes 48, in turn, causes their second surfaces 49B to block even more the clockwise flow of the liquid between the ends of the vanes and the inner wall surface 43 of the compartment 42, thereby further increasing the liquid pressure and friction on the rotating inner wall surface 43 of the compartment, which tends to brake the clockwise acceleration and the rotation of the compartment and thereby tends to brake the clockwise acceleration and the rotation of the roller 12 in accordance with this invention when retracting the shade 16. In addition, this flexing of the vanes 48 causes the ends of their first surfaces 49A (when the vanes are fully flexed) to be pushed against, and frictionally restrain rotation of, the inner surface 43 of the compartment 42, thereby still further braking the clockwise rotation of the compartment 42 and the roller 12 in accordance with this invention.

If desired, a liquid can be used in the compartment 42 of the fluid brake 40, the viscosity of which increases with increased agitation as a result of the radial flexing of the vanes 48. This will tend to brake further the clockwise acceleration and the rotation of the compartment 42 and the roller 12 caused by the flexing of the vanes in accordance with this invention when retracting the shade 16.

By comparison, when the shade 16 is lowered or unwound and the spring 39 becomes tighter or wound up, the roller 12 and the roller-retarding compartment 42 of the fluid brake 40 rotate counter-clockwise in FIGS. 2A and 3A, and the liquid in the compartment 42 rotates counterclockwise with the inner surface 43 of the compartment, but the vanes 48 of the impeller 46, mounted on the fixed centre rod 24, do not rotate. However, the ends of the first vane surfaces 49A of the vanes 48, because of their flexibility and resilience, move away from the inner surface 43 of the compartment 42 when the positive differential pressure between the second surface 49B and first surface 49A of each of the vanes is removed by the counter-clockwise rotation of the viscous liquid in the compartment. Moreover, the ends of the first vane surfaces 49A, because of their convex shape, are urged away from the inner surface 43 of the compartment 42 by the negative differential pressures between the second surfaces 49B and first surfaces 49A of the vanes caused by any acceleration of the counter-clockwise rotation of the liquid in the compartment. As a result, the vanes 48 do not block significantly the counter-clockwise flow of the liquid in the compartment 42 between the ends of the vanes and the inner surface 43, and in addition, the viscosity of the liquid, if variable, does not increase. Thus when unwinding the shade 16, there is not significant pressure on the inner surface 43 of the compartment 42 from either the liquid in the compartment or from the vanes 48 which retards or brakes significantly the counter-clockwise acceleration of the rotation of the compartment and the roller 12 in accordance with this invention.

A modified version of the fluid brake 40 of FIGS. 2, 2A, 3 and 3A is shown in FIGS. 4 and 4A, and like parts are indicated by like reference numerals. Secured to the left end portion of the fixed centre rod 24, within the fluid-tight compartment 42 of the fluid brake 40, is an impeller 46. The impeller 46 is positioned concentrically within the compartment 42 on the longitudinally-extending axis of rotation of the compartment. The impeller 46 has a hub 47, on which is a radially-extending disk 50, preferably integral with the hub, carrying a plurality of flexible and preferably inherently resilient vanes 52. The vanes 52, which are eccentrically positioned on the left side of the disk 50, are of triangular cross-section and extend longitudinally to the left, so that they are close to, but spaced away from, the left end of the compartment 42. Each vane 52 has a first curvilinear surface 54 corresponding to the inner peripheral wall surface 43 of the compartment 42, a second angled surface 56 that extends substantially parallel to the axis of rotation of the compartment, and a third surface 58 extending radially of the axis of rotation of the compartment 42. The first surface 54 of each vane 52 is adjacent to the inner wall surface 43 and can be flexibly moved towards the inner surface 43 when there is a radially outwardly directed pressure on the second surface 56 of the vane, relative to its first surface 54. When such radial pressure is removed, each vane 52 can return to its relaxed state with its first surface 54 spaced slightly away from the inner surface 43. During acceleration of clockwise rotation of the roller 12 when unwinding the shade 16, the compartment 42 and the liquid in the compartment (in FIG. 4a) also rotate clockwise with the roller, and the differential pressure of the liquid on the second surfaces 56 of the vanes 52, relative to their first surfaces 54, is nil or negative. Therefore, the vanes remain at rest so that their first surfaces 54 are spaced away from the inner wall surface 43 of the compartment 42. This allows the inner wall surface 43 to rotate freely in the clockwise direction.

During acceleration of the counter-clockwise rotation of the roller 12 when retracting the shade 16, the compartment 42 and the liquid (in FIG. 4a) also rotate counter-clockwise with the roller, and the differential pressure of the liquid on the second surfaces 56 of the vanes 52, relative to their first surfaces 54, is positive. Therefore, the vanes flex so that their first surfaces 54 are pushed against, and frictionally restrain rotation of, the inner surface 43 of the compartment. Thereby, the impeller 46 and its fixed disk 50 and vanes 52 provide braking of the counter-clockwise acceleration of the rotation of the compartment 42 of the fluid brake 40 and the roller 12 when retracting the shade 16 in accordance with this invention. If desired, this effect can be enhanced by using a liquid in the compartment 42 whose viscosity increases with increasing agitation of the liquid caused by increases in the rotational speed of the liquid about the vanes 52.

FIG. 6 shows another modified roller 12, in which like parts are indicated by like reference numerals. The shade-winding mechanism in accordance with the invention includes a fluid brake 40, as shown in FIGS. 2, 2A, 3 and 3A, with a hub 47 of an impeller 46 that is coupled to a one-way clutch 60, preferably via an epicyclic gear train 70, so that the fluid brake is operative between the roller 12 and the fixed centre rod 24 only when rewinding or retracting the shade 16. In this regard, the one-way clutch 60, shown in more detail in FIG. 8, has an outer longitudinally-extending tubular bushing 62 surrounding an inner, radially-extending ramp wheel 64 that is fixed to the left end of the fixed centre rod 24. Curvilinear notches 66 are provided at the periphery of the ramp wheel 64, and within the notches 66 are longitudinally-extending rollers or needles 68. On the left end of the bushing 62 (remote from the centre rod 24) are mounted longitudinally-extending pins 71 (shown in FIG. 6) that form the axes of the planet gear wheels 72 of the epicyclic gear train 70 shown in FIGS. 6 and 7 and discussed below.

When the roller 12 rotates in a clockwise direction (in FIGS. 6–8) when retracting the shade 16, the compartment 42 of the fluid brake 40 also rotates clockwise, causing the liquid in the compartment to tend to rotate clockwise. However, the clockwise rotation of the liquid within the compartment is hindered by the surfaces of the vanes 48 of, the impeller 46, which extend radially of the axis of rotation of the compartment 42 as discussed above. As a result, the liquid hinders the clockwise rotation of the compartment which in turn retards the clockwise rotation of the roller 12. This retarding effect on the clockwise rotation of the roller is increased by the use of a one-way clutch 60 of FIG. 8 and an epicyclic gear train 70 of FIG. 7 to rotate the impeller 46 in a counter-clockwise direction as described below.

As best shown in FIGS. 6 and 7, the epicyclic gear train 70 has an outer ring gear 74 connected to the inner surface of the roller 12. When the roller 12 rotates clockwise, so does the outer ring 74 of the gear train 70. This causes the planet gear wheels 72, engaged by the outer ring gear 74, to rotate clockwise about their own axes and the axis of the gear train 70. As a result, the planet gear wheels 72, rotatably mounted on the bushing 62 of the one-way clutch 60, cause the bushing 62 to also rotate clockwise. This causes the inner surface of the bushing 62 to frictionally urge the needles 68 of the one-way clutch 60 to also move in a clockwise direction, which causes the needles 68 to move up ramp-like surfaces 67 of the notches 66 of the ramp wheel 64 where the needles 68 become wedged between the inner surface of the bushing 62 and the notches 66. Because the ramp wheel 64 is fixed to the centre rod 24, the bushing 62 and its pins 71 can no longer rotate clockwise once the needles 68 become so-wedged, and as a result, the planet gear wheels 72 no longer rotate clockwise about the axis of the gear train 70 but rotate only clockwise about their own axes with clockwise rotation of the roller 12 and the outer ring gear 74. Such clockwise rotation of the planet gear wheels 72 about their own axes causes a sun gear 76 of the gear train 70 to rotate in a counter-clockwise direction at a speed higher than that of the roller 12.

The sun gear 76 is mounted on the right end of a longitudinally-extending shaft 78 which extends through the cover 44 of the compartment 42 of the fluid brake 40. The left end of the shaft 78, within the compartment 42, is affixed to the impeller hub 47, with the vanes 48 on it as shown in FIGS. 2 and 3. As a result, clockwise rotation of the roller 12, which causes counter-clockwise rotation of the sun gear 76, also causes counter-clockwise rotation of the impeller 46 in the compartment 42 while the compartment and its liquid are rotating clockwise. Thereby, the retarding effect of the radial surfaces of the vanes 48 of the impeller 46 of the fluid brake 40 on the rotation of the liquid, the compartment 42 and the roller 12 of FIG. 6, connected to the compartment, is increased as compared to the effect achieved within the roller 12 of FIG. 5. Thus, a less viscous liquid can be used for certain shades and blinds. When the roller 12 rotates in a counter-clockwise direction (in FIGS. 6–8) when unwinding the shade 16, the cuter ring gear 74 of the gear train 70 also rotates counter-clockwise. As a result, the planet gear wheels 72 also rotate counter-clockwise about their own axes and the axis of the gear train, which causes the bushing 62 of the one-way gear 60 also to rotate counter-clockwise. Counter-clockwise rotation of the bushing 62 causes its inner surface to frictionally urge the needles 68 of the clutch also to move counter-clockwise, which causes the needles 68 to move away from the ramp-like surfaces 67 of the notches 66 of the ramp wheel 64, away from the inner surface of the bushing 62 and against radially-extending curved surfaces 69 of the notches 66 as shown in FIG. 8. As a result, the inner surface of the bushing 62 and its pins 71 can continue to rotate counter-clockwise, without hindrance from the needles 68 or the ramp wheel 64, fixed to the centre rod 24. Thereby, the planet gear wheels 72 also can continue to rotate counter-clockwise about the axis of the gear train 70, and this causes the counter-clockwise rotation of the outer ring gear 74 with the roller 12 to be transmitted to the sun gear 76 so that the sun gear, together with the shaft 78 and impeller 46 also rotate counter-clockwise. Thus, the impeller 46 with its vanes 48 will rotate counter-clockwise with the liquid in the fluid brake, so as not to retard the rotation of the liquid or the compartment 42 or the roller 18.

This arrangement of FIGS. 6–8 provides an improved braking effect on the spring-assisted clockwise rotation of the roller 12 when winding up the shade 16, but it allows relatively free counter-clockwise rotation of the roller 12 when unwinding the shade and tensioning the spring 39. This is because the one-way clutch 60 of FIG. 8 is disengaged when the roller shade 12 is pulled downwardly to unroll it but is engaged when the shade is retracted, and unnecessary resistance from the fluid brake 40 and the gear train 70 on rotation of the roller 12 is eliminated when unwinding the shade. Alternatively, an impeller 46 with the disk 50 of FIGS. 4 and 4A can be fixed to the left end of the shaft 78 in this arrangement, provided that the other elements of the roller blind 1 are reversed to have spring-assisted counter-clockwise rotation of the roller 12 when winding up the shade 16 and clockwise rotation of the roller when unwinding the shade.

It will be appreciated that in any architectural covering of this invention, such as the roller blind 1 shown in the Figures, the fluid brake 40, instead of being within the roller 12, could be mounted externally of the roller and be, for example, on one of the mounting brackets 10A or 10B. Likewise, the fluid brake 40 could be provided within a spool or other winding element, about which a lift cord or tape of an architectural covering, such as a pleated blind, is wound and unwound with rotation of the winding element about its axis of rotation. Also, the impeller 46, instead of being mounted so as to be stationary within the compartment 42 of the fluid brake 40 shown in FIG. 5, could be designed to rotate with the roller 12 in order to brake its rotation in accordance with this invention, with the compartment 42 then being designed to remain stationary with the centre rod 24 or to rotate in a direction opposite to the direction of rotation of the vanes and disk.

Figure 9A:
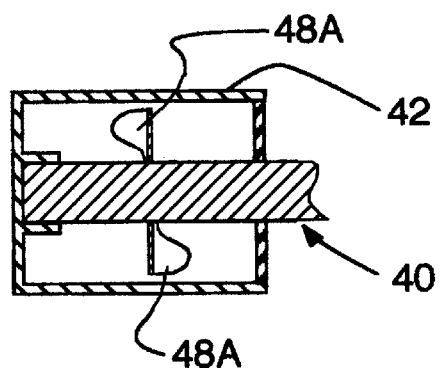
FIG. 9A is a cross-section along the line IX—IX of FIG. 9.
Figure 10A:
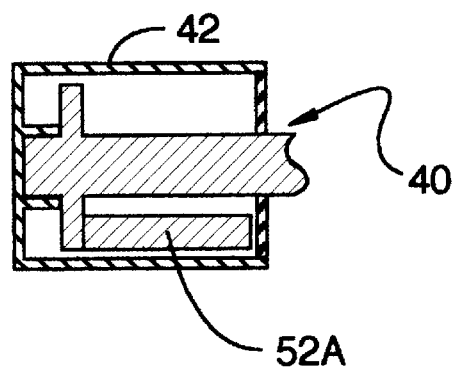
FIG. 10A is a cross-section along the line X—X of FIG. 10.
Figure 11A:
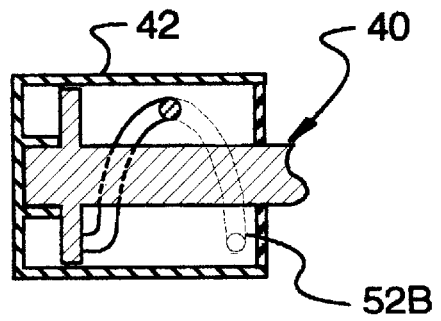
FIG. 11A is a cross-section along the line XI—XI of FIG. 11.
Figure 12:
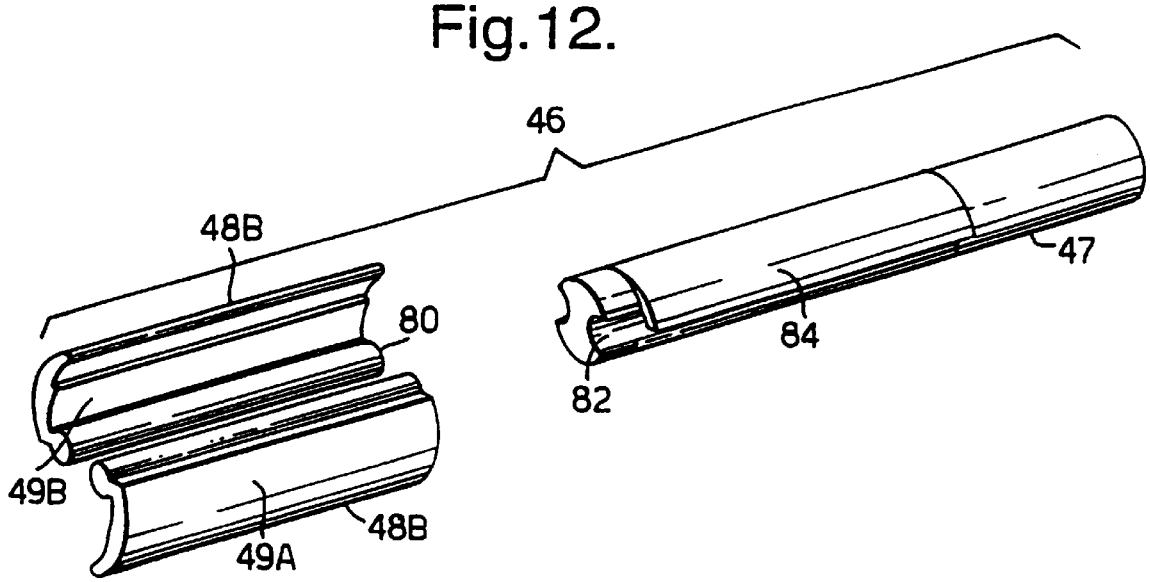
FIG. 12 is an exploded view of an impellar of a sixth embodiment of a fluid brake.

Furthermore when a viscous liquid is used in the compartment 42 of the fluid brake 40, the viscosity of which increases with increasing agitation and turbulence thereof, the vanes 48 protruding radially from the hub 47 of the impeller 46 of FIGS. 2, 2A, 3 and 3A and the vanes 52 eccentrically mounted on, and protruding axially from, the radially-extending disk 50 of the impeller 46 of FIGS. 4 and 4A ca be replaced by other structures for a agitating and creating turbulence in the viscous liquid. For example, the curved fan-shaped blades 48A of FIGS. 9 and 9A, the cylindrical figures or vane 52A of curved FIGS. 10 and 10A or the helical stirring element or vane 52B of FIGS. 11 and 11A can be part of the impeller 46 mounted on the fixed centre rod 24 of FIG. 5 or on the rotatable shaft 78 of FIG. 6 within the compartment 42. Likewise, the vanes 48 of the impeller 46 of FIGS. 2, 2A, 3 and 3A could be replaced by radially extending vanes on the inner surface 43 of the fluid-tight compartment 42.

An especially preferred impeller 46 for a fluid brake 40 of this invention is shown in FIGS. 12–16. The impeller comprises a plurality of vanes 48B that protrude radially from, and are hingedly connected to, the hub 47 of the impeller 46. Preferably, each vane 48B is connected to the impeller hub 47 by means of a longitudinally-extending rounded bead 80 on the bottom of the vane which is slidingly inserted into a mating longitudinally-extending, rounded groove 82 on the circumference of the impeller hub 47. Each vane 48B is relatively rigid and preferably has a curvilinear cross-section that is concave towards its second surface 49B. It is particularly preferred that the impeller 46 and its vanes 48B be longitudinally elongate, particularly when a less viscous liquid is to be used in the fluid brake 40.

Figure 13:
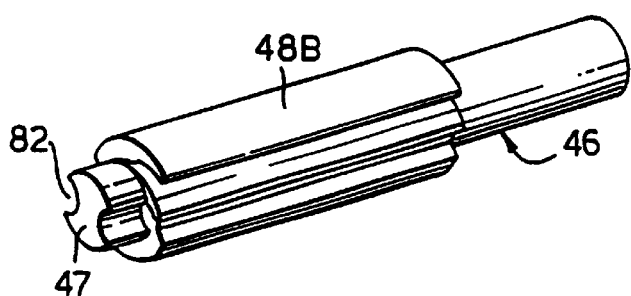
FIG. 13 is a perspective view of the impellar of FIG. 12 with its vanes unextended.
Figure 14:
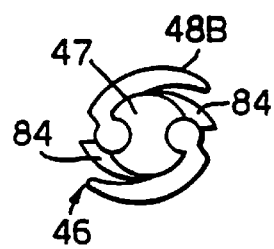
FIG. 14 is an end view of the impeller of FIG. 13.
Figure 15:
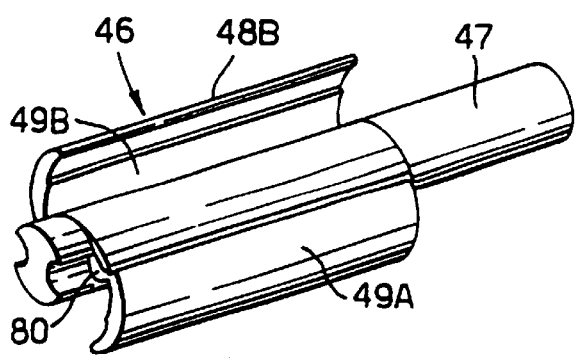
FIG. 15 is a perspective view of the impeller of FIG. 12 with its vanes extended.
Figure 16:
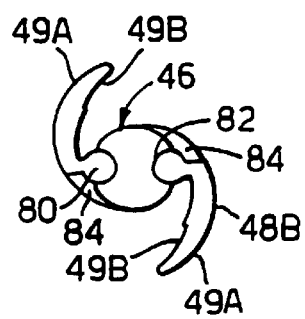
FIG. 16 is an end view of the impeller of FIG. 15.

The vanes 48B can move radially outwardly, in a counter-clockwise direction in FIGS. 14 and 16, between an unextended position as shown in FIGS. 13–14 and an extended position as shown in FIGS. 15–16. The vanes 48B can move in this way when pressure is exerted against their second surfaces 49B by counter-clockwise rotation in FIGS. 14 and 16 of the viscous liquid in the fluid-tight compartment 42 of the fluid brake, in response to counter-clockwise rotation of the roller 12 when raising the shade 12. The vanes 48B can also move radially inwardly, in a clockwise direction in FIGS. 14 and 16, between an extended position as shown in FIGS. 15–16 and an unextended position as shown in FIGS. 13–14. The vanes can move in this manner when pressure is exerted against their first surfaces 49A by clockwise rotation in FIGS. 14 and 16 of the viscous liquid in the fluid-tight compartment 42 (not shown in FIGS. 12–16) of the fluid brake, in response to clockwise rotation of the roller 12 when lowering the shade 16.

Preferably, the hub 47 of the impeller 46 of FIGS. 12–16 is provided with a stop member 84 for each vane 48B. It is preferred that each stop 84 be integrally formed on the impeller hub 47, adjacent to one of its grooves 82 and adapted to abut against the vane 48B in the groove when the vane moves to its fully extended position as shown in FIGS. 15 and 16. In this regard, it is especially preferred that the stops 84 limit the travel of the radial ends of the vanes 48B, particularly to a travel of about 1.5–3 mm, quite particularly about 2 mm.

This invention is, of course, not limited to the above-described embodiments which may be modified without departing from the scope of the invention or sacrificing all of its advantages. In this regard, the terms in the foregoing description and the following claims, such as "left", "right", "longitudinal", "bottom", "top", "axial", "radial", "clockwise", "counter-clockwise", "inner", "outer" and "end", have been used only as relative terms to describe the relationships of the various elements of the winding mechanism of the invention for architectural coverings.

What is claimed is:

1. An architectural covering and a winding mechanism for controlling the retraction and deployment of the architectural covering, said winding mechanism having a winding element, about which the covering, or lift cords or tapes attached to the covering are wound and unwound with rotation of the winding element about a first axis of rotation, and a fluid brake for retarding the rotation of the winding element in at least one direction about the first axis; the fluid brake comprising a fluid-tight compartment containing a liquid and an impeller and wherein the compartment and the impeller are adapted for relative rotation about a second axis of rotation; the compartment or the impeller is operatively connected to the winding element; the liquid rotates with rotation of the compartment or the impeller about the second axis; rotation of the liquid relative to the impeller or to the compartment in at least a first direction about the second axis is effective to retard the rotation of the winding element in at least a second direction about the first axis; and the impeller or an inner peripheral wall surface of the compartment include a first surface that extends generally radially with respect to the second axis, wherein said first surface is of fan blade configuration.

2. The architectural covering and winding element of claims 1, wherein said liquid is of variable viscosity.

3. The architectural covering and winding element of claim 2, wherein the viscosity of said liquid increases with increasing agitation and turbulence of the liquid.

4. An architectural covering and a winding mechanism for controlling the retraction and deployment of the architectural covering, said winding mechanism having a winding element, about which the covering, or lift cords or tapes attached to the covering are wound and unwound with rotation of the winding element about a first axis of rotation, and a fluid brake for retarding the rotation of the winding element in at least one direction about the first axis; the fl id brake comprising a fluid-tight compartment containing a liquid and an impeller having a hub and at least one vane and wherein: the compartment and the impeller are adapted for relative rotation about a second axis of rotation; the compartment or the impeller is operatively connected to the winding element; the liquid rotates with rotation of the compartment or the impeller about the second axis; rotation of the liquid relative to the impeller or to the compartment in at least a first direction about the second axis is effective to retard the rotation of the winding element in at least a second direction about the first axis; and the vane of the impeller or an inner peripheral all surface of the compartment include a surface which is outwardly curved regardless of the direction of rotation.

5. An architectural covering and a winding mechanism for controlling the retraction and deployment of the architectural covering, said winding mechanism having a winding element, about which the covering, lift cords or tapes attached to the covering are wound and unwound with rotation of the winding element about a first axis of rotation, and a fluid brake for retarding the rotation of the winding element in at least one direction about the first axis; the fluid brake comprising a fluid-tight compartment containing a liquid and an impeller and wherein: the compartment and the impeller are adapted for relative rotation about a second axis of rotation; the compartment or the impeller is operatively connected to the winding element; the liquid rotates with rotation of the compartment or the impeller about the second axis; rotation of the liquid relative to the impeller or to the compartment in at least a first direction about the second axis is effective to retard the rotation of the winding element in at least a second direction about the first axis; and the impeller or an inner peripheral wall surface of the compartment include a first surface that is cylindrical in configuration.

6. An architectural covering and a winding mechanism for controlling the retraction and deployment of the architectural covering, said winding mechanism having a winding element, about which the covering or lift cords or tapes attached to the covering are wound and unwound with rotation of the winding element about a first axis of rotation, and a fluid brake for retarding the rotation of the winding element in at least one direction about the first axis; the fluid brake comprising a fluid-tight compartment containing a liquid and an impeller and wherein: the compartment and the impeller are adapted for relative rotation about a second axis of rotation; the compartment or the impeller is operatively connected to the winding element; the liquid rotates with rotation of the compartment or the impeller about the second axis; rotation of the liquid relative to the impeller or to the compartment in at least a first direction about the second axis is effective to retard the rotation of the winding element in at least a second direction about the first axis; and the impeller or an inner peripheral wall surface of the compartment include a first surface that is generally helical in configuration.

* * * * *

UNITED STATES PATENT AND TRADEMARK OFFICE
CERTIFICATE OF CORRECTION

PATENT NO. : 6,666,252 B2
DATED : December 23, 2003
INVENTOR(S) : Konrad Welfonder It is certified that error appears in the above-identified patent and that said Letters Patent is hereby corrected as shown below:

Column 11,
Line 46, after "the", second occurrence, delete "fi id" and insert -- fluid --.

Column 12,
Lines 18 and 39, after "impeller", insert -- having a hub and at least one vane --; and
Lines 26 and 47, after "the," second occurrence, insert -- vane of the --.

Signed and Sealed this

Twentieth Day of April, 2004

JON W. DUDAS
*Acting Director of the United States Patent and Trademark Office*